June 19, 1956 H. S. HOFFMAN 2,750,981
ANTI-SKID DEVICE
Filed Feb. 19, 1954 3 Sheets-Sheet 3

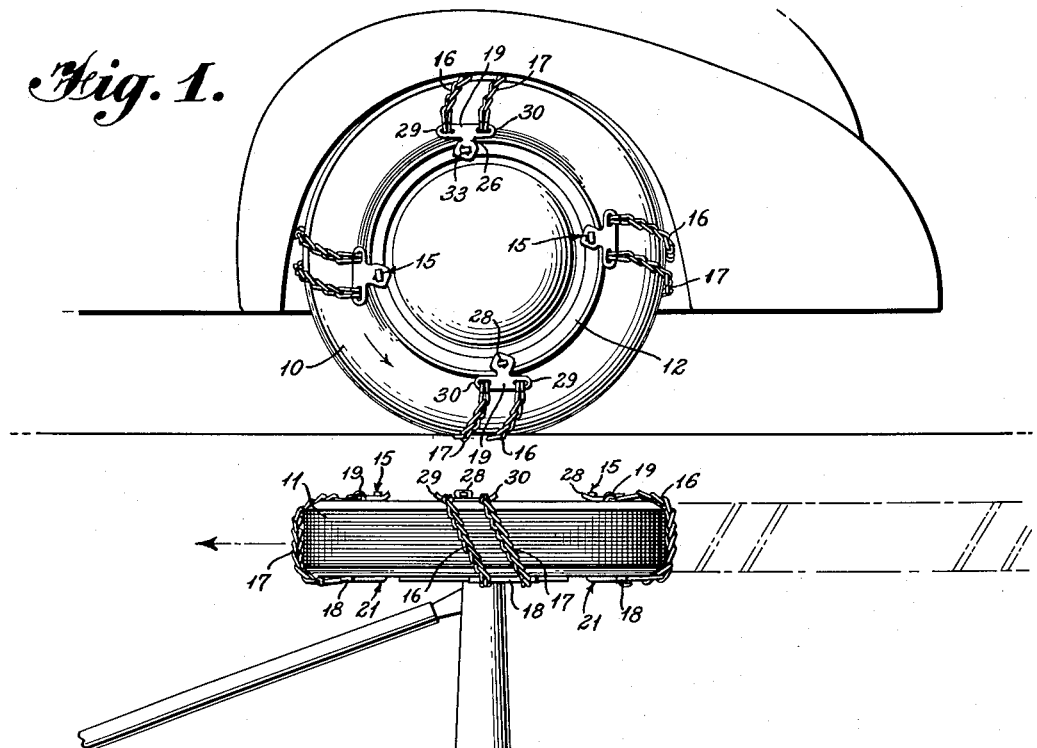
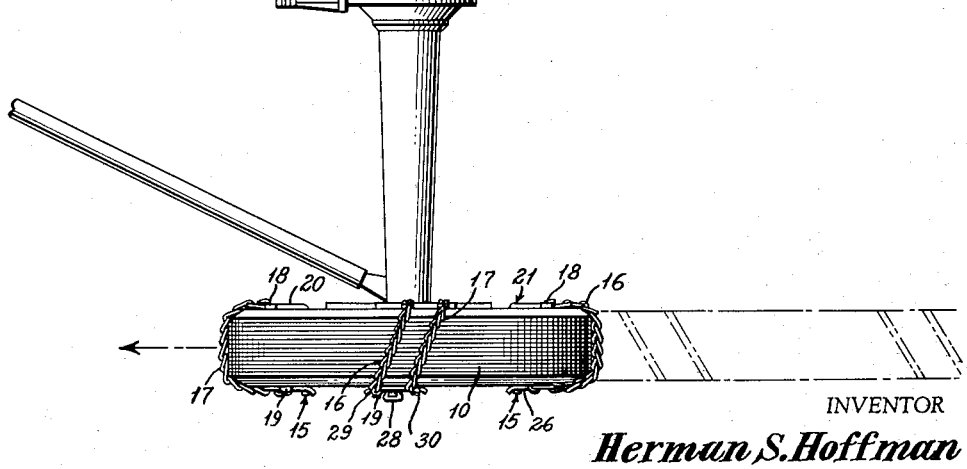

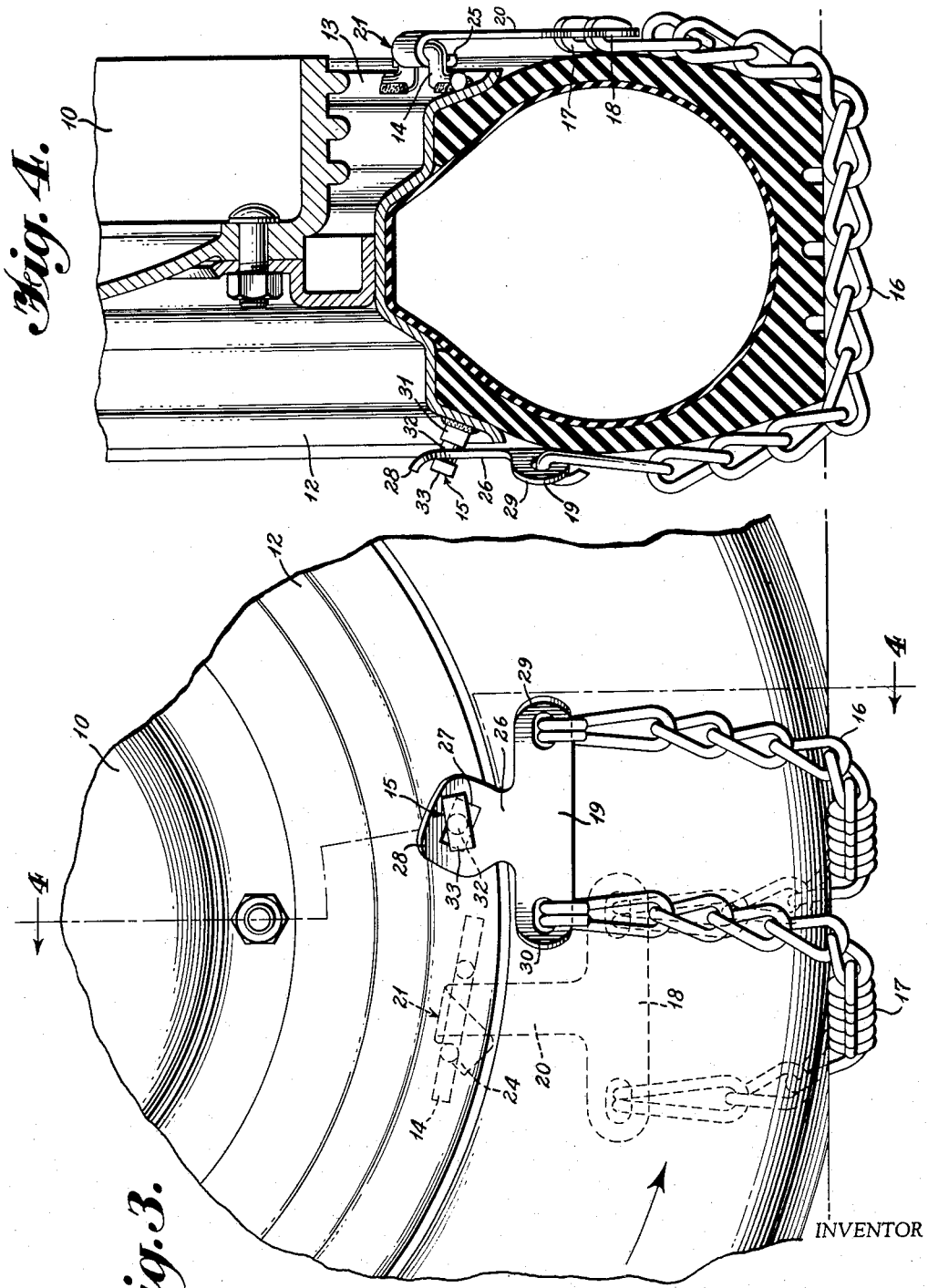

INVENTOR
*Herman S. Hoffman*

BY *Stevens, Davis, Miller & Mosher*
ATTORNEYS

United States Patent Office 2,750,981
Patented June 19, 1956

2,750,981

ANTI-SKID DEVICE

Herman S. Hoffman, Washington, D. C.

Application February 19, 1954, Serial No. 411,329

6 Claims. (Cl. 152—236)

This invention relates to anti-skid devices for use with automobiles and is more particularly concerned with improvements in the anti-skid equipment as disclosed in application Serial No. 266,665, filed January 16, 1952, now Patent No. 2,686,550.

In the prior application mentioned above, there is disclosed an anti-skid device in which pairs of chains are disposed obliquely across the tires of an automobile from circumferentially offset anchorage points on the opposite flanges of the tire rims of the wheel. These chains afford improved traction and more comfortable riding qualities as well as being far easier to install than conventional tire chains.

It is proposed according to this invention further to increase the facility with which the chains may be attached and detached from the automobile wheel consistent with high reliability of operation under adverse conditions and low production and maintenance costs.

Other objects and advantages of this invention will be apparent from the following detailed description of several embodiments thereof in conjunction with the annexed drawings wherein:

Figure 1 is a view in elevation of an automobile wheel having affixed thereto anti-skid chains according to the present invention;

Figure 2 is a plan view of the rear wheels of an automobile showing the position assumed by the anti-skid chains of the present invention;

Figure 3 is a detailed view in elevation of the outside of an automobile wheel equipped with chains of the present invention;

Figure 4 is a view in section taken on the line 4—4 of Figure 3;

Figure 6:
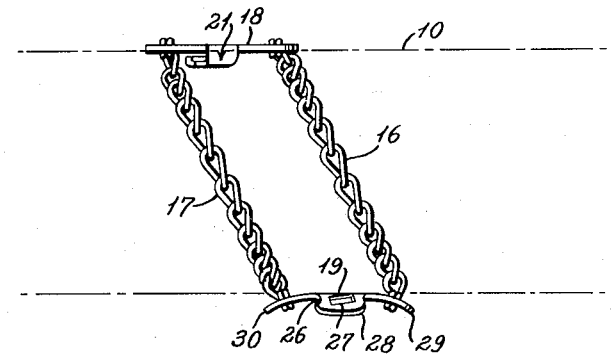
Figure 6 is a bottom plan view of the showing of Figure 3.

Referring now in detail to Figures 1 to 4 inclusive and Figure 6, the numerals 10 and 11 represent the rear wheels of an automobile to which the anti-skid devices of the present invention are attached. Since the arrangement with respect to wheels 10 and 11 is identical the description of one will suffice for both.

The wheel 10 is provided with an outer flange 12 and an inner flange 13 which hold the pneumatic tire. To these there are affixed symmetrically arranged, circumferentially spaced stirrups 14 on the inner flange 13 and outer mounting means 15 on the outer flange 12. The stirrups 14 are spaced about the flange 13 in staggered relation to the disposition of the mounting means 15 about flange 12, so that tire chains extending across the tire from a stirrup 14 to the nearest adjacent mounting means 15 follow an oblique path, as is clearly evident in Figures 1 and 2.

The chains are arranged in four pairs, as can be seen from Figure 1. Since the number of pairs is dependent largely upon the desires of the user of the automobile in relation to the operating conditions which he expects to meet, the actual number is not critical so long as the pairs are symmetrically arranged. Since each pair is like every other pair, it will suffice for purposes of this specification to describe from a structural point of view, a single pair of chains and this can be done with ease if concurrent reference is made to Figures 3 to 8, inclusive.

Figure 5:
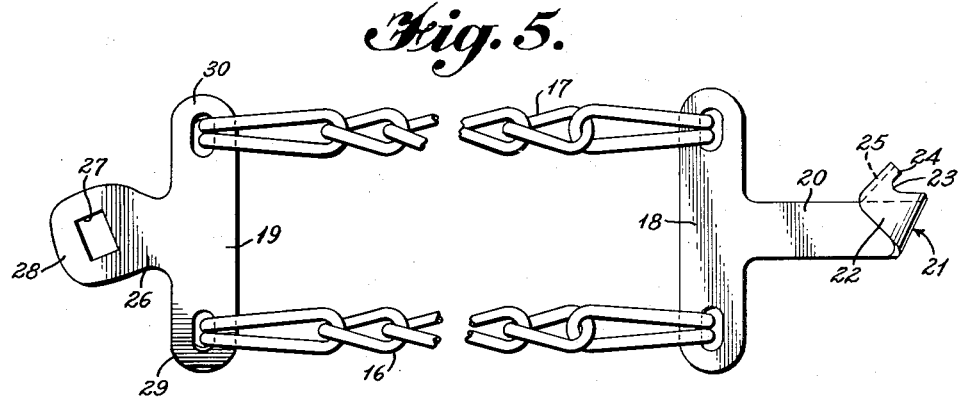
Figure 5 is a top plan view of a complete anti-skid chain assembly according to the present invention.
Figure 7:
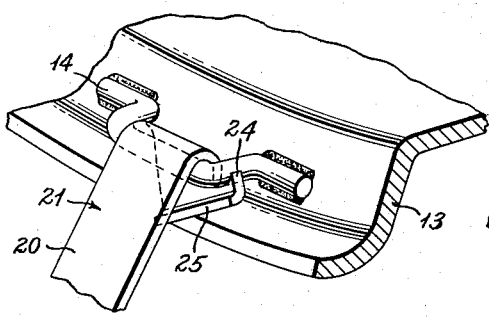
Figure 7 is a fragmentary perspective view of the inside fastening arrangement.

In Figure 5, the tire chain assembly is disclosed in plan view. It can be seen that it consists of a pair of cross chains 16 and 17 held in spaced relation at their respective ends by cross chain plates 18 and 19. Cross chain plate 18 has integral therewith shank 20 of open hook 21. In forming hook 21, its end 22 is bent over the shank 20 about a line oblique to the long axis of shank 20. The end 22 is further characterized by a cut-out portion 23 which in effect defines a detent 24 at the tip of end 22. Also a rib or flange 25 is provided at the transverse edge of end 22. Referring to Figure 7 the hook 21 is shown engaged in a stirrup 14. Initially the hook 21 is merely dropped into the slot or aperture defined by stirrup 14. Thereafter, when the tire chains are disposed obliquely across the tire, such action will have the effect of locking the hook 21. This occurs because the stirrup engages in the cut-out 23 and hence, the detent 24 lies beneath the stirrup 14 preventing the hook 21 from being released from the stirrup 14 while the tire chains are disposed obliquely across the tire. The rib or flange 25 is a safety feature which will function to engage the stirrup 14 and prevent the hook 21 from being released therefrom particularly when the hook 21 is at the top of the tire and facing downward. This arrangement of hook 21 and stirrup 14 renders it possible to apply the hook to the stirrup on the inside flange of a wheel by feel and without having visual access to the particular stirrup to which attachment is being made.

Cross chain plate 19 has integral therewith a second plate 26 which defines a rectangular slot 27 oblique to the axis of plate 26. By way of example only and not as a restriction on this invention, good results are attained when slot 27 is disposed about 22 degrees to the transverse axis of plate 26. Further, plate 26 is bent outwardly at its end 28 as will be appreciated from Figure 4. The ends 29 and 30 of plate 19 are likewise bent outwardly.

Figure 8:
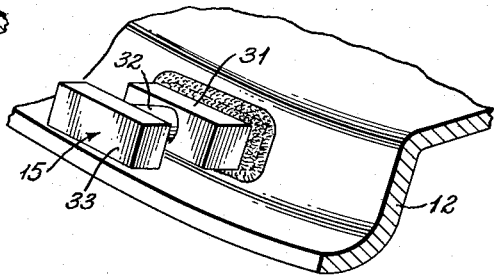
Figure 8 is a fragmentary perspective view of the mounting means on the outside of the wheel.

The mounting means 15 is shown in Figure 8 and consists of a base element 31 shown as welded to flange 12, an intermediate connecting element 32 of substantially reduced width, and a mounting element 33 which engages with the plate 26 through the agency of the slot 27 as shown in Figures 3 and 4. In essence mounting means 15 is H-shaped in silhouette with the legs of the H being longer or shorter or even of different lengths as necessary or desired.

To place the plate 26 into secure engagement with mounting means 15, the following procedure is recommended. The plates 20 and 26 are placed in proximity with the tire with the slot 27 substantially in alignment with element 33. The plate 26 is then rocked to one side as will be permitted by the curved ends 29 and 30 of plate 20 and one end of the element 33 is received in the slot 27 until the edge of slot 27 abuts against element 32. Thereafter the plate 26 is rocked in the opposite direction causing the other end of the element 33 to be received in slot 27. It will be noted from Figure 3 that the element 33 is slightly longer than the slot 27. Thus, the back surface of element 33 will engage with the forward or outside surface of plate 26 holding same securely against detaching.

There remains an infinitesimal possibility that at some time, conceivably the element 33 and slot 27, if both were in alignment, could accidentally become detached by element 33 jumping out of the slot 27. To positively insure that this won't happen, no matter how remote the possibility, the slot 27 is cut angularly offset relative to the element 33. It will thus be known that this will result in the mounting means 15 and the plate 26 remaining engaged under all circumstances of use.

The bend at the end 28 of plate 26 functions to prevent the cross chain plate 19 from injuring the tire upon collapse of the tire with the device of the present invention mounted on the tire. When the tire collapses, the plates 19 and 26 will, instead of being drawn into the tire, be rocked about end 28 away from the tire.

While this invention has been described with reference to several embodiments thereof, it is to be understood that various changes and modifications lie within the spirit, scope and contemplation of the invention.

What is claimed is:

1. An anti-skid assembly for an automobile having a wheel mounted thereon for rotation, said wheel having on one side thereof means defining a circumferentially elongated aperture, mounting means fixed to the other side of said wheel, said anti-skid assembly comprising an open hook for engagement in said aperture means on the one side of the wheel, said hook and said aperture means defining coacting means to lock said hook against disengagement in one position of engagement, said hook being unlocked for disengagement from said aperture means in all other positions of engagement, an anti-skid chain connected at one end to said hook, a plate connected to the other end of said chain, said plate defining an elongated slot with the longitudinal axis of said slot obliquely disposed with respect to the longitudinal axis of said anti-skid chain, and said plate in engagement with said mounting means.

2. An anti-skid assembly as defined in claim 1 wherein said mounting means is H shaped in silhouette.

3. An anti-skid assembly as defined in claim 1 wherein said hook at its end is provided with a rib which functions to prevent accidental disengagement of said hook from said aperture means.

4. An anti-skid device including a pair of elongated chains, a hook connected to one end of said chains, a T-shaped plate composed of an elongated cross arm portion and an integral stem portion, the cross arm portion of said T-shaped plate defining an aperture adjacent each end thereof with the other ends of said chains being connected with said cross arm portion through said apertures, the stem portion of said T-shaped plate extending normally from said cross arm portion and defining adjacent the free end of said stem portion, an elongated slot having its longitudinal axis angularly disposed with respect to the longitudinal axis of said cross arm portion.

5. An anti-skid device including a pair of elongated chains, a hook connected to one end of said chains, a T-shaped plate composed of an elongated cross arm portion and an integral stem portion, the cross arm portion of said T-shaped plate defining an aperture adjacent each end thereof with the other ends of said chains being connected with said cross arm portion through said apertures, the ends of said cross arm portion being bent about an axis substantially normal to the longitudinal axis of said cross arm portion so that the ends of said cross arm portion are slightly approached, the stem portion of said T-shaped plate extending normally from said cross arm portion and defining adjacent the free end of said stem portion, an elongated slot having its longitudinal axis angularly disposed with respect to the longitudinal axis of said cross arm portion.

6. An anti-skid device including a pair of elongated chains, a hook connected to one end of said chains, a T-shaped plate composed of an elongated cross arm portion and an integral stem portion, the cross arm portion of said T-shaped plate defining an aperture adjacent each end thereof with the other ends of said chains being connected with said cross arm portion through said apertures, the ends of said cross arm portion being bent about an axis substantially normal to the longitudinal axis of said cross arm portion so that the ends of said cross arm portion are slightly approached, the stem portion of said T-shaped plate extending normally from said cross arm portion and defining adjacent the free end of said stem portion, an elongated slot having its longitudinal axis angularly disposed with respect to the longitudinal axis of said cross arm portion, the free end of said stem portion being bent about an axis substantially parallel to the longitudinal axis of said cross arm portion so that the free end of said stem portion is slightly approached toward the ends of said cross arm portion.

References Cited in the file of this patent

UNITED STATES PATENTS

| | | |
|---|---|---|
| 987,806 | Kibby | Mar. 28, 1911 |
| 1,278,782 | Stoner | Sept. 10, 1918 |
| 1,764,785 | Frykman | June 17, 1930 |
| 2,327,669 | Richard | Aug. 24, 1943 |
| 2,420,804 | Wenzel | May 20, 1947 |
| 2,631,636 | Chanceller | Mar. 17, 1953 |

FOREIGN PATENTS

| | | |
|---|---|---|
| 188,743 | Germany | Sept. 16, 1907 |